No. 747,324. PATENTED DEC. 15, 1903.
D. E. KEMPSTER.
ANTIFRICTION BEARING.
APPLICATION FILED FEB. 13, 1902.
NO MODEL.
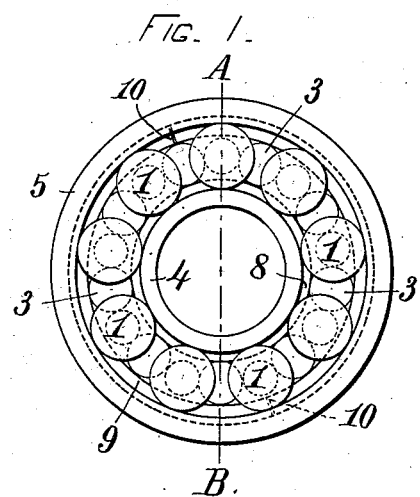
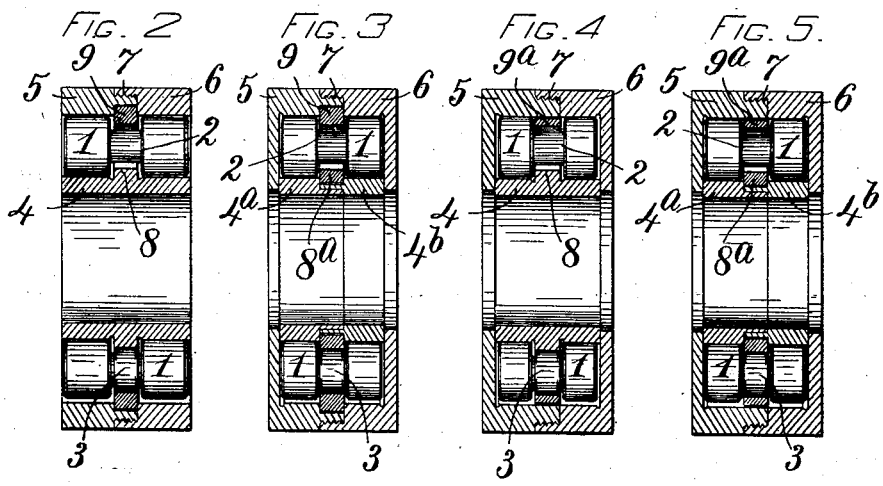
WITNESSES
Winthrop W. Fisk,
Cora J. Chadbourn.
INVENTOR
Daniel E. Kempster
by
Henry Chadbourn
his atty.

No. 747,324. Patented December 15, 1903.

UNITED STATES PATENT OFFICE.

DANIEL E. KEMPSTER, OF BOSTON, MASSACHUSETTS.

ANTIFRICTION-BEARING.

SPECIFICATION forming part of Letters Patent No. 747,324, dated December 15, 1903.

Original application filed December 31, 1900, Serial No. 41,751. Divided and this application filed February 13, 1902. Serial No. 93,863. (No model.)

*To all whom it may concern:*

Be it known that I, DANIEL E. KEMPSTER, of Boston, in the county of Suffolk and State of Massachusetts, have invented certain new and useful Improvements in Antifriction-Bearings, of which the following is a specification.

This invention relates to improvements in antifriction - bearings more especially designed for sheaves of pulley-blocks, wheel-hubs for heavy vehicles, and similar places where the bearing is submitted to a heavy strain and forms a division of my pending application, Serial No. 41,751, filed December 31, 1900.

The object of this invention is to produce a substantial bearing suitable for heavy work, one which will be durable and is self-contained, whereby it may be transported and remain intact.

The invention consists in the novel construction, arrangement, and combination of parts, substantially as hereinafter described, and particularly set forth in the claims annexed hereto and forming a part thereof.

The invention is carried out substantially as illustrated on the accompanying drawings, which form an essential part of this specification, and whereon like characters of reference refer to like parts wherever they occur on the different parts of the drawings.

On the drawings, Figure 1 represents a side elevation of my improved antifriction-bearing. Fig. 2 represents a central section of the bearing on the line A B in Fig. 1. Figs. 3, 4, and 5 represent sectional views similar to that shown in Fig. 2, but of slightly different embodiments of my invention.

When antifriction-bearings are to be used to support very heavy loads, it is desirable that the surfaces upon which the rolls of the bearing travel should be made of hardened steel or other wear-resisting metal, as should also the surfaces upon which the separators travel when separators are used between said rolls, and it is not always convenient to harden the pin, shaft, or journal upon which the bearing is used, and therefore both inner and outer hardened tracks for the rolls or rolls and separators when separators are used are preferably provided in my present construction independent of the pin, shaft, or journal to be used therewith, thus making the bearing ready for use upon the heaviest and most trying class of work whether the pin, shaft, or journal is hardened or not. It is also desirable to be able to transport an antifriction - bearing self - contained in all its parts in an assembled and properly-adjusted condition, so that any person may be able to apply the bearing as a substitute for an injured bearing of the same construction or for other purposes whether he be skilled in the art or a novice thereto. In antifriction-bearings in which separators are used to separate the bearing-rolls it is desirable that the tracks on which the separators travel should be elevated above those on which the load-sustaining rolls travel in order to prevent dirt or other accumulations from remaining upon said tracks and clogging the separators. In order to accomplish these results, I construct my improved bearing substantially as follows:

I use a series of rolls 1, each roll of the series being provided with an annular groove 2, which is preferably arranged substantially midway its length and so that the several grooves will coincide with each other and be in the same plane. When these rolls are to be kept separated from each other, I employ a series of separators 3. Each separator is preferably made in a disk form and so inserted between each two rolls of the series of rolls that they enter the grooves in their adjacent rolls and engage the necks formed on the rolls by the groove in said rolls; but it is not essential in all cases that such separators should be used, as other forms of rolling separators might be used or such separators might be entirely dispensed with, if so desired. These rolls 1 and the separators 3, when used, are located within a casing having two concentrically-arranged annular surfaces, one within the other, the inner surface being preferably formed upon a bushing 4, forming the inner track for the rolls, and the outer annular surface being formed, preferably, upon a bushing forming the outer track for the rolls. The outer bushing is preferably formed of sections, which I prefer to form as shown, which sections 5 and 6 are joined together by the screw-threaded joint 7 or by other suitable means. These inner and outer bushings are provided with projecting ribs, which ribs may be made as an integral part of the bushings or as separate rings, as shown and as described hereinafter, and said ribs are so arranged upon said bushings that they coincide with each other and enter the grooves in the series of rolls. One or both of these projecting ribs are made in one piece with their respective bushings, or are so attached to said bushings that they are prevented from longitudinal movement in relation thereto, and I have shown several embodiments of this construction on the drawings.

In Figs. 1, 2, and 4 the externally-projecting rib 8 on the inner bushing has been shown as made in one piece with the bushing, while in Figs. 3 and 5 the externally-projecting rib $8^a$ on the inner bushing has been shown as made as a separate piece placed within an annular groove on the exterior of said inner bushing, which bushing in such a construction is preferably made in two sections $4^a$ and $4^b$, joined together at their meeting edges, forming the grooves to receive the projecting rib $8^a$, substantially as shown, or said sections of the inner bushing might be in one piece, having the annular groove formed upon its exterior surface, and the rib $8^a$ be divided into two semicircular sections and introduced within the groove in the bushing; but I prefer to form the bushing in such a case in two sections, substantially as shown. In some cases it may be deemed desirable to form the inner bushing with an integral projecting rib, substantially as shown in Figs. 1, 2, and 4, and divide such into two semicircular sections.

In Figs. 1, 2, and 3 the internally-projecting rib on the outer bushing has been shown as made in the form of a ring 9, separate from the outer bushing and entering an annular groove formed at the meeting edges of the sections 5 and 6 of said outer bushing, while in Figs. 4 and 5 this projecting rib has been made in the form of a ring $9^a$, having its outer diameter equal to the inner diameter of the sections 5 and 6 of the outer bushing and pressed firmly into its proper place, or said ring $9^a$ may be made with a diameter a little less than the inner diameter of the sections 5 and 6 of the outer bushing and be free to rotate within said outer casing, if so desired, but in no case allowing said ring to move from a position where its surface will be other than concentric with the track on the outer bushing for the rolls.

As the projecting ribs on the outer and on the inner bushings are both arranged to enter the grooves in the series of rolls, it will be evident that it will be necessary to divide one or both of said ribs into semicircular form in order to be able to assemble the rolls within the casing, and I prefer to divide the ring which forms the internally-projecting rib on the outer bushing in this manner, substantially as shown at 10 in Fig. 1.

By forming the casing of the bearing of two concentric bushings of different diameters arranged one within the other, each having an annular projecting rib and each ring or rib projecting toward the other bushing, I am able to form an annular raceway for the annularly-grooved rolls, the cross-section of which will be substantially that of the longitudinal section of one of the annularly-grooved rolls of the series of rolls and by this means to hold both parts of the casing, as well as the series of rolls, in their proper relative positions, and the bearing thus assembled and intact.

If I desire to use the series of separators 3 between the rolls, I introduce them, so that they will enter the annular grooves on the two adjacent rolls, which they separate, and so that said series of separators will travel in the annular raceway formed between the internally and externally projecting ribs on the respective outer and inner bushings of the casing, said separators having their outer track on the inner surface of the internally-projecting rib on the outer bushing and their inner track upon the outer surface of the externally-projecting rib on the inner bushing. As these tracks for the separators are held constantly concentric with the tracks for the rolls on the inner and outer bushings, and as the diameter of the rolls is such as to practically fill the space between their inner and outer tracks, it will be seen that the separators will maintain constantly a uniform position in relation to the necks of the rolls and are prevented from moving laterally independent of the rolls. This is a very essential feature in the production of a smooth and noiseless-running antifriction-bearing and prevents the parts of the bearing from wearing out of alinement with each other. The separators are held intact and prevented from moving longitudinally in relation to the rolls and casing by their inner and outer tracks on the projecting ribs and by entering the grooves in the rolls.

Having thus fully described the nature, construction, and operation of my invention, I wish to secure by Letters Patent and claim—

1. In a roller-bearing, a series of rolls annularly grooved to form necks thereon, a series of separators of lesser diameter than the rolls, one between each two rolls of the series, entering the grooves in the rolls and engaging the necks thereof, inner and outer circular bushings forming tracks for the rolls, the inner bushing adapted to receive the shaft or journal upon which the bearing is to be used and inner and outer circular tracks for the separators located intermediate the inner and outer tracks for the rolls and held concentric with the inner and outer bushings, whereby a raised circular raceway is formed for the separators and maintained concentric with the tracks on said bushings for the rolls and an inclosed antifriction-bearing with self-contained tracks for the rolls and separators is formed which may be removed intact from the shaft or journal on which it is to be used.

2. In a roller-bearing, a series of rolls with annular grooves forming necks thereon, a series of rolling separators, one between each two rolls of the series, entering the grooves in the rolls and engaging the necks thereof, a central bushing provided externally with inner tracks for the rolls and an intermediate annularly-projecting track entering the grooves in the rolls and forming an inner track for the separators, a sectional outer bushing forming outer tracks for the rolls and an intermediate internally-projecting annular track for the separators entering the grooves in the rolls, whereby the bearing is held assembled and intact.

3. In a roller-bearing, a casing formed with two concentrically-arranged annular bearing-surfaces one within the other and constituting inner and outer tracks for a series of load-sustaining rolls, an annular rib on each of said surfaces, each rib projecting toward and in alinement with the other, a series of annularly-grooved rolls receiving both projecting ribs within the grooves on the rolls, and rolling separators between the rolls entering the grooves therein and holding the separators in position between said ribs.

4. An antifriction-bearing, consisting of a series of annularly-grooved rolls, a series of separators of lesser diameter than the rolls, alternating with said rolls and entering the grooves thereof, combined with two bushings, one within the other, the space between them forming a circular raceway for the rolls and separators, the inner bushing adapted to receive the shaft or journal upon which the bearing is to be used, a cross-section of the circular raceway substantially coinciding with a central longitudinal section of one of the annularly-grooved rolls, and whereby a self-contained antifriction-bearing with inner and outer tracks for the rolls and separators is formed which may be removed intact from the shaft or journal on which it is to be used.

5. In a roller-bearing, a series of rolls with annular grooves thereon, a series of separators alternating with the rolls and entering the grooves thereon, an inner bushing with an externally-projecting rib entering the grooves in the rolls, and an outer bushing with a divided internally-projecting separable rib also entering the grooves in the rolls, said ribs holding the bearing assembled and intact.

6. In an antifriction-bearing, a series of rolls grooved annularly to form necks thereon, and a casing for said series of rolls, comprising an inner bushing forming inner tracks for said rolls and having an integral externally-projecting annular rib entering the grooves in the rolls, an outer bushing made in sections, forming outer tracks for said rolls, a ring formed of two semicircular sections held in place by the outer bushing and forming an internally-projecting annular rib on said outer bushing entering the grooves in the series of rolls, and means to hold the sections of the outer bushing together and intact, for the purpose set forth.

In testimony whereof I have affixed my signature in presence of two witnesses.

DANIEL E. KEMPSTER.

Witnesses:
  HENRY CHADBOURN,
  CORA J. CHADBOURN.